United States Patent
Hamann et al.

(10) Patent No.: US 12,498,970 B2
(45) Date of Patent: Dec. 16, 2025

(54) SCHEDULING OF COMPUTATIONAL PROCESSES

(71) Applicant: Robert Bosch GmbH, Stuttgart (DE)

(72) Inventors: Arne Hamann, Ludwigsburg (DE); Dakshina Narahari Dasari, Boeblingen (DE); Dirk Ziegenbein, Freiberg am Neckar (DE); Michael Pressler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 469 days.

(21) Appl. No.: 18/064,668

(22) Filed: Dec. 12, 2022

(65) Prior Publication Data

US 2023/0244524 A1 Aug. 3, 2023

(30) Foreign Application Priority Data

Jan. 24, 2022 (DE) ..................... 10 2022 200 736.0

(51) Int. Cl.
*G06F 9/48* (2006.01)
*G06F 11/34* (2006.01)

(52) U.S. Cl.
CPC ........ *G06F 9/4881* (2013.01); *G06F 11/3495* (2013.01)

(58) Field of Classification Search
CPC .. G06F 9/4881; G06F 11/3495; G06F 9/4887; G06F 9/5044; G06F 2209/483; G06F 9/5038; G06F 9/5027; G06F 15/163
See application file for complete search history.

(56) References Cited

U.S. PATENT DOCUMENTS

| | | | |
|---|---|---|---|
| 2022/0214864 A1* | 7/2022 | Singhal | G06F 16/9024 |
| 2022/0244315 A1* | 8/2022 | Yang | H02J 7/0071 |
| 2023/0221999 A1* | 7/2023 | Heyl | G06F 9/5044 718/100 |
| 2024/0126754 A1* | 4/2024 | Li | G06F 16/2453 |

* cited by examiner

Primary Examiner — Sisley N Kim
(74) Attorney, Agent, or Firm — NORTON ROSE FULBRIGHT US LLP

(57) ABSTRACT

A method of a quality of service scheduler for scheduling the execution of a first and second linked atomic computational process on a heterogenous processing system including a first and a second processor of a different type. The method includes: receiving, from an application, a request to compute a job, the job including first and second linked atomic computational processes, and being associated with a quality of service requirement; determining, based on a register of elements of the heterogenous processing system, one or more tentative execution plans of the first and second linked atomic computational processes on the elements; selecting, as an intended execution plan, an execution plan of the first and second linked atomic computational processes, wherein the intended execution plan is capable of meeting the quality of service requirement provided by the application; and scheduling the execution of the first and second linked atomic computational processes.

13 Claims, 3 Drawing Sheets

SCHEDULING OF COMPUTATIONAL PROCESSES

CROSS REFERENCE

The present application claims the benefit under 35 U.S.C. § 119 of German Patent Application No. DE 10 2022 200 736.0 filed on Jan. 24, 2022, which is expressly incorporated herein by reference in its entirety.

FIELD

The present invention relates to a computer-implemented method of a quality of service scheduler for scheduling the execution of at least a first and second linked atomic computational process on a heterogenous processing system comprising at least a first and a second processor of a different type, and an associated system, computer program element, and computer readable medium.

BACKGROUND INFORMATION

Embedded processing systems implemented as a System on Chip frequently execute at least two applications having different levels of criticality, such as safety criticality. Systems on chip are increasingly comprised of a number of different types of processor, such as a central processing unit and a graphics processing unit. In a context where at least two applications having different levels of criticality are executed, there is still, nevertheless, a need to arbitrate between quality of service concerns of the at least two applications when executed between heterogenous processors.

Currently, QOS aspects are typically addressed for a single resource. Cache colouring may be used to dedicate cache resources. Mechanisms such as reservation based scheduling may be used to provision CPU resources. Network resource reservation protocols to provision network resources. Approaches for resource allocation in an embedded processing system executing at least two applications having different levels of criticality may, therefore, be further improved.

SUMMARY

According to a first aspect of the present invention, there is provided a computer-implemented method of a quality of service scheduler for scheduling the execution of at least a first and second linked atomic computational process on a heterogenous processing system comprising at least a first and a second) processor of a different type. According to an example embodiment of the present invention, the method comprises:
  receiving, from an application, a request to compute a job, wherein the job comprises at least first and second linked atomic computational processes, and wherein the job is associated with a quality of service requirement provided by the application;
  determining, based on a register of a plurality of elements of the heterogenous processing system denoting at least the first and a second (GPU) processor, one or more tentative execution plans of at least the first and second linked atomic computational processes on the plurality of elements of the heterogenous processing system;
  selecting, as an intended execution plan, an execution plan of the at least first and second linked atomic computational processes on at least a first and a second processor of a different type comprised in the heterogenous processing system, wherein the intended execution plan is capable of meeting the quality of service requirement provided by the application; and
  scheduling the execution of the at least first and second linked atomic computational processes on the at least first and a second processors of a different type according to the intended execution plan.

A centralised quality of service scheduler, or manager, within a heterogenous system on Chip can translate end-to-end requirements for the computation of a sequence of processes (an event chain) for different processors (compute nodes) within a system on Chip into specific resource requirements, and then work towards reserving those resources. Therefore, coordinated resource reservation across multiple different compute resources can be provided in order to meet the timing requirements of an application comprised of an event chain. Additionally, there may be a need to translate an end-to-end latency requirement into individual resource requirements, enabling latency-aware coordination of resource allocations. The proposed quality of service scheduler manages multiple heterogenous resources and provides holistic resource management. The QOS scheduler has a global view of the availability of the resources, and thus can prioritise the resource allocations to different applications, and provide end-to-end timing guarantees for the execution of an event chain in a distributed context.

According to a second aspect of the present invention, there is provided a system comprising:
  a heterogenous processing system comprising at least a first processor, and a second processor of a different type; and
  a scheduler configured to schedule the execution of at least first and second linked atomic computational processes on the heterogenous processing system (SOC). According to an example embodiment of the present invention, the scheduler is configured to:
  receive, from an application, a request to compute a job, wherein the job comprises at least first (44) and second (46) linked atomic computational processes, and wherein the job is associated with a quality of service requirement provided by the application;
  determine, based on a register of a plurality of elements of the heterogenous processing system (SOC) denoting at least the first and a second processor, one or more tentative execution plans of at least the first and second linked atomic computational processes on the plurality of elements of the heterogenous processing system;
  select, as an intended execution plan, an execution plan of the at least first and second linked atomic computational processes on at least a first and a second processor of a different type comprised in the heterogenous processing system, wherein the intended execution plan is capable of meeting the quality of service requirement provided by the application; and
  schedule the execution of the at least first and second linked atomic computational processes on the at least first and a second processors of a different type according to the intended execution plan.

According to a third aspect of the present invention, there is provided a computer program element comprising machine-readable instructions which, when executed by a processor, cause the processor to perform the method of the first aspect.

According to a fourth aspect of the present invention, there is provided a computer readable medium comprising the computer program element of the third aspect.

BRIEF DESCRIPTION OF THE DRAWINGS

Exemplary embodiments of the present invention are depicted in the figures, which are not to be construed as limiting the present invention and are explained in greater detail below.

DETAILED DESCRIPTION OF EXAMPLE EMBODIMENTS

Figure 1:
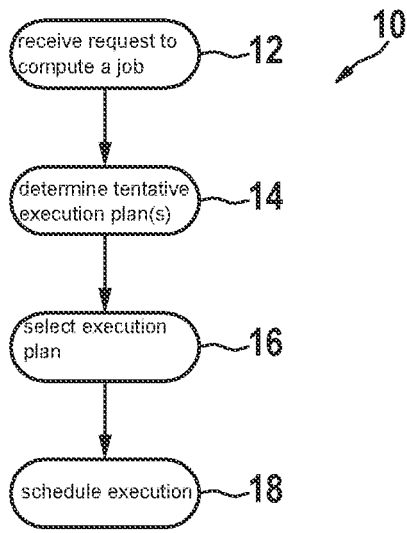
FIG. 1 schematically illustrates a method according to the first aspect of the present invention.

Emerging applications such as autonomous driving are compute and data intensive. There is therefore a trend towards using high performance computing platforms in such cyber-physical systems. Software applications operating in the context of autonomous driving have varying timing requirements which must share the same computing platform (such as a system on chip, SOC). The computing platform is generally characterised by multiple heterogenous processors (cores) organised in a cluster. The processors share a last level cache, one or multiple shared interconnection networks (buses) from the processors to the memory, and a shared main memory.

In an example, autonomous driving applications are realised by the sensing, processing, and control pipeline. In an example of an autonomous driving application that can be broken down into the tasks of (i) perception (sensing), (ii) path planning (processing), and (iii) control functions, each task is deployed on suitable processors in a heterogenous System on Chip. For example, computer vision functions related to perception may be delegated to a graphics processing unit (GPU) rather than a general purpose computer core (CPU), designated in the drawings of this application as C1, with multiple CPU because being designated C2, C3, C4.

For the autonomous driving application to function correctly, fixed timing constraints must be met across the sense-process-control pipeline. For example, path planning tasks cannot take place without completion of the perception task. When different applications with diverging requirements are simultaneously deployed on a heterogenous system on Chip, there is a need to ensure that enough resources are reserved in order for each of the applications with different criticalities and varying levels of quality of service guarantee to coexist such that all timing guarantees can be met.

Figure 3A:
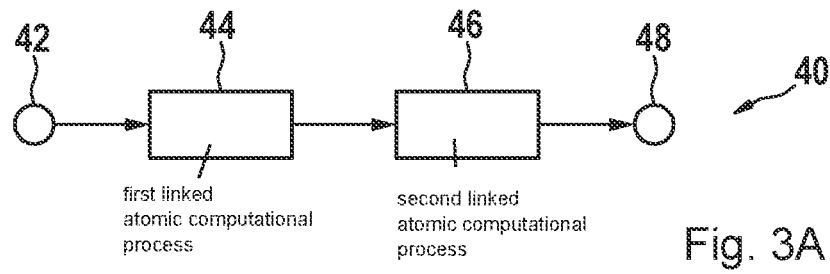
FIGS. 3A-3C schematically illustrate examples of processing chains involving heterogenous processing resources, according to the present invention.
Figure 3B:
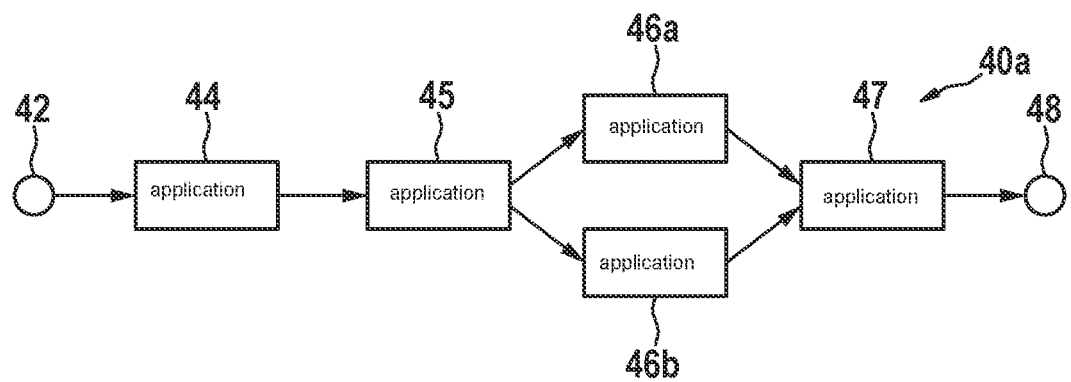
Figure 3C:
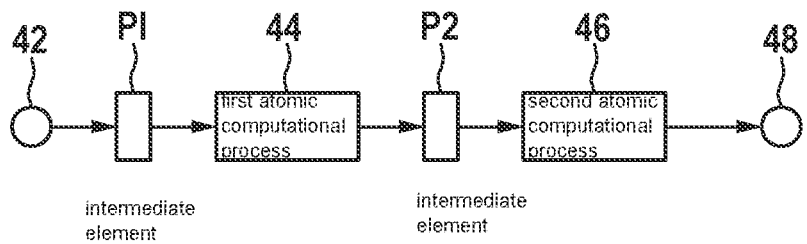

Turning briefly to FIGS. 3A and 3C, an illustration is provided of three different types of event chain. An event chain is a set of related, non-independent, connected functions which realise functionality in a coordinated manner. Each function of the event chain is considered to be an atomic computational process (in other words, not capable of being broken down into smaller functions). The sensor, processing, and actuating functions may be represented, for example, in a graph, where nodes of the graph represent a processor of a heterogenous system on Chip, and weighted edges represent data passed from one processor to another (whether by interconnect, memory reads, or cache reads). Each event chain must be completed within a given time, for correct results to be obtained. The end-to-end latency requirement is the interval between the time that input is received by the first function in the event chain, until the time that the final result is produced. Of course, a series of intermediate latency requirements reflective of the structure of the event chain can also be considered.

Figure 4:
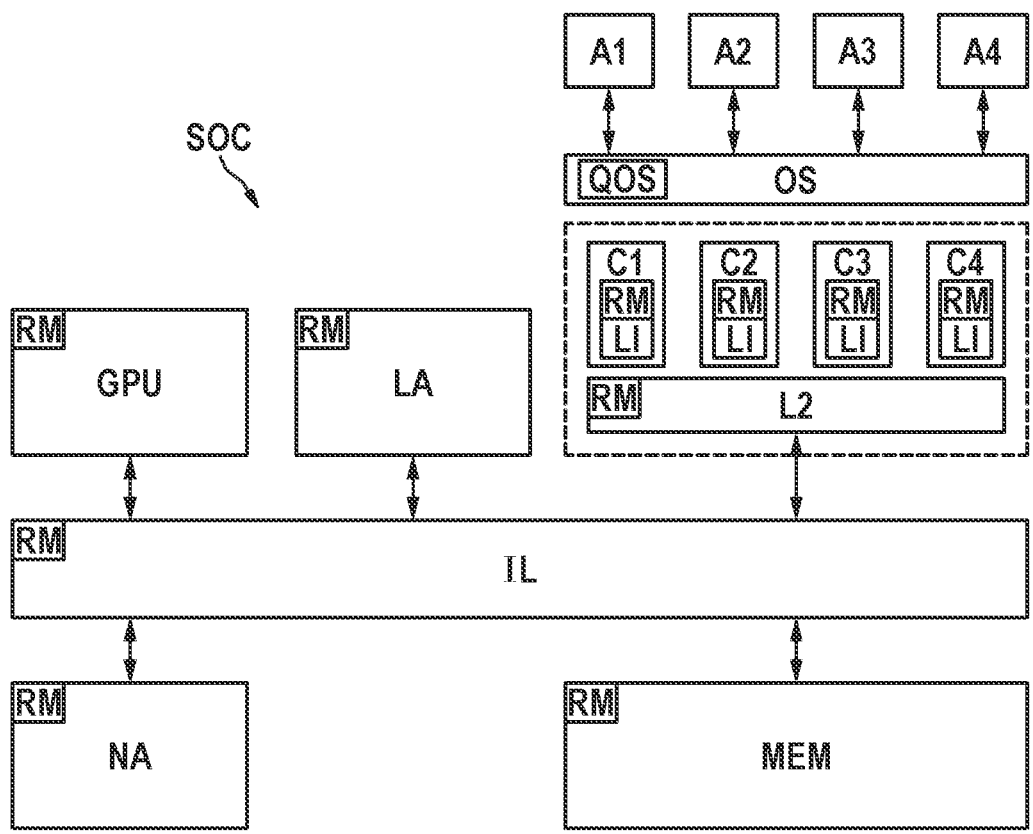
FIG. 4 schematically illustrates a further example of a system on chip architecture, according to an example embodiment of the present invention.

FIG. 3B illustrates an event chain for execution on the heterogenous system on Chip illustrated in FIG. 4. For example, the event chain comprises multiple applications 44, 45, 46a, 46b, and 47, each with a given priority. The event chain consists of different functions needing different processors, cache, interconnect, and memory in the heterogenous system on Chip. The different functions may have different preferences as to implementation on a CPU or a GPU, or have different memory bandwidth needs.

In an example, every event chain 40, 40a inherits the priority of its associated application A1-A4. Every event chain 40, 48 has an end-to-end latency requirement defining a maximum time that collapse between input data being received at the input node 42, and output data being output from the output node 48. In order to meet these end-to-end latency requirements, every evens chain needs multiple resources and a guaranteed level of quality of service. In the example of FIG. 3B, functions 44, 45, 46a, and 47 execute on one or more CPUs C1-C4. Function 46b is executed on a GPU. To realise the application A1 correctly, multiple resources are involved, and bounded guarantees on obtaining resources must be provided. For example, it may be defined that one or more of the CPUs C1-C4 provides a set number of units of processing time to an application A1 per time unit. A given number of transactions may need to be transferred from application A1 by the CPU C1 to the GPU with a predictable interconnect bandwidth. A bounded throughput may be defined of the application A1 when executed on the GPU. The memory MEM may be required to process a predefined number of memory transactions of the application A1 in a given number of time units.

Therefore, there is a need for coordinated resource provisioning and resource reservation across multiple heterogenous resources of a system on Chip to ensure that the end-to-end timing requirements of the event trains are met. Although individual solutions for monitoring individual resources of a heterogenous system on Chip are given, for example cache colouring for cache related issues, no coordinated quality of service scheduler is present to ensure the timing requirements of applications needing multiple heterogenous resources are met.

FIG. 1 schematically illustrates a method according to the first aspect.

According to a first aspect, there is provided a computer-implemented method 10 of a quality of service scheduler for scheduling the execution of at least a first 44 and second 46 linked atomic computational process on a heterogenous processing system comprising at least a first C1 and a second GPU processor of a different type, comprising:

receiving 12, from an application A1-A4, a request to compute a job, wherein the job comprises at least first and second linked atomic computational processes, and wherein the job is associated with a quality of service requirement provided by the application;

determining 14, based on a register of a plurality of elements of the heterogenous processing system denoting at least the first C1 and a second GPU processor, one or more tentative execution plans of at least the first and second linked atomic computational processes on the plurality of elements of the heterogenous processing system;

selecting 16, as an intended execution plan, an execution plan of the at least first and second linked atomic computational processes on at least a first and a second processor of a different type comprised in the heterogenous processing system, wherein the intended execution plan is capable of meeting the quality of service requirement provided by the application; and scheduling 18 the execution of the at least first and second linked atomic computational processes on the at least first and a second processors of a different type according to the intended execution plan.

Accordingly, it is proposed to provide a centralised quality of service QOS scheduler (or quality of service scheduler). The computational jobs received may be, for example, a sensing, processing, or actuating function of an autonomous vehicle. This sequence may be considered an event chain, to be completed by a fixed deadline.

The centralised QoS scheduler may, for example, be a software module executed in the operating system of a software environment, or in the hypervisor of a virtualised software environment. The QoS scheduler receives as input at least one quality of service requirement required by an application executed on the heterogenous processing system SOC. For example, the at least one quality of service requirement may be an end to end latency requirement of an event chain. The at least one quality of service requirement may comprise a requirement to use a certain type of processor for a certain atomic computation in the event chain. The at least one quality of service requirement may comprise at least one subsidiary deadline for at least one, and optionally all, atomic computational processes in the event chain. The at least one quality of service requirement is not limited to timing considerations. For example, the at least one quality of service requirements may specify a minimum memory bandwidth, or interconnect bandwidth, between a first processor and a second processor of the heterogenous processing system.

The input to the QoS scheduler is, in an example, one or more event chains consisting of different functions, the end-to-end latency requirement of the event chain and the mapping of the different functions to the different compute nodes, and, for example, a globally unique priority. The QOS scheduler takes input requirements of the one or more event chains, and reserves sufficient resources for each of the chains.

Having received the at least one quality of service requirement, the quality of service scheduler QOS translates the quality of service requirements into resource requirements, and searches the heterogenous processing system SOC for processors of different types that are capable of implementing the at least one quality of service requirement. In an example, the quality of service scheduler may participate in a negotiation with at least two resource managers of different processors to obtain reservation of a processor or other resource in the heterogenous processing system needed by the event chain. The resource managers RM of the heterogenous processing system SOC may respond to the quality of service scheduler with a response defining a status and/or resource reservation opportunity of at least one resource in the heterogenous processing system. Taken together, these may be used by the QoS manager to generate one or more tentative execution plans. The QoS scheduler then selects one of the tentative execution plans capable of meeting the quality of service requirement, and denotes it as an intended execution plan. The QOS scheduler provides details of the intended execution plan to the subject application A1. Computing a plurality of tentative execution plans has the advantage that if the intended execution plan fails, or is superseded, other plans can quickly be negotiated with resource managers of the SOC.

The register of a plurality of elements of the heterogenous processing system defines an identity, and the capability, of all elements addressable in the SOC by an application. Furthermore, the register provides a constantly updated record of which resources are currently occupied, or partially occupied, as a function of time. Given an event chain and a quality of service requirement such as a deadline by an application A1, the quality of service scheduler can compare the event chain and quality of service requirement to records in the register of the plurality of elements, to generate one or more tentative execution plans. The selection of an intended execution plan may be based on a criterion such as which intended execution plan can complete the highest priority event chain in the shortest time. Alternatively, the selection of intended execution plan may be multi-factorial. The quality of service scheduler may compare a plurality of completion times of a corresponding plurality of intended execution plans that are before a deadline for an event chain. Of the subset of intended execution plans that satisfy the deadline for the event chain, the quality of service should allocate processors based on factors such as minimising a cache L2 occupancy, or cache L2 access, of one or more processors, and/or minimising memory bandwidth of one or more processors, and/or minimising main memory MEM usage of one or more processors.

Figure 2:
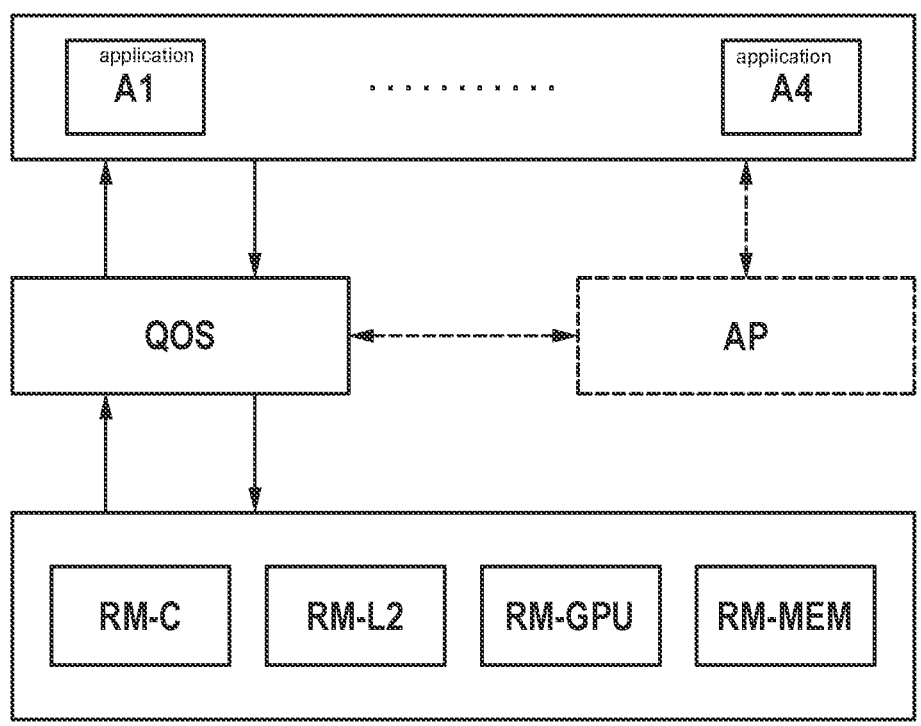
FIG. 2 schematically illustrates an example of a system on chip architecture, according to an example embodiment of the present invention.

FIG. 2 schematically illustrates an example of a system on chip architecture.

In brief, one or more applications A1-A4 may generate at least one event chain comprising at least two linked atomic computational processes to be computed on the heterogenous processing system SOC. The at least one event may be associated with quality of service requirements provided by A1-A4 such as latency or performance requirements, priorities, and particular execution characteristics. The QOS scheduler may transform the at least one event chain to individual resource requirements.

In an example, the QOS scheduler may use hardware platforms providing hardware support for quality of service. For example, the QOS scheduler may use the ARM™ MPAM framework, by allowing application identities to be recognised by the underlying hardware. In an example, the QOS scheduler configures the registers in the cache L2 and the interconnect IL to reserve appropriate resources directly, per application. Heterogenous processor platforms in which application identities are not recognisable by the underlying hardware may apply mechanisms such as cache colouring to achieve a similar result. Other hardware regulation mechanisms such as the Intel™ "Memory Bandwidth Allocation" may be applied analogously.

According to an embodiment, the method further comprises executing the at least first 44 and second 46 linked atomic computational processes on at least the first C1 and the second GPU processor of a different type comprised in the heterogenous processing system SOC according to the intended execution plan to thus compute the job, and returning the result of the job to the application A1-A4.

According to an embodiment, the quality of service requirement provided by the application A1-A4 is a deadline LT defining when the at least first 44 and second 46 linked atomic processes must have returned the result of the job to the application.

Figure 5:
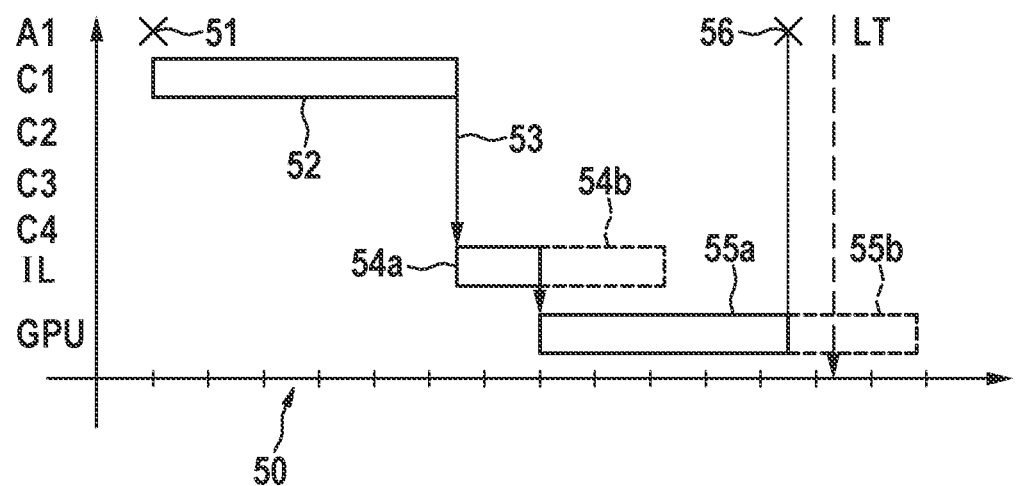
FIG. 5 schematically illustrates timing constraints on a heterogenous processing system, according to an example embodiment of the present invention.

Turning briefly to FIG. 5, an example of two tentative execution plans against elapsed time is provided. An application A1 requires a processing job to be performed in an event chain comprising a processing task requiring at least some CPU time 52, and a further processing task requiring at least some GPU time 55*a*. The entry point of the computation is at 51. One tentative execution plan schedules an atomic processing task 52 on a CPU C1. Interconnect having a variable bandwidth is required transfer data from the output of the first atomic processing task 52 to a GPU, where a second atomic processing task 55 is performed. A first tentative execution plan involves a high-bandwidth use of the interconnect 54*a*. A second tentative execution plan involves a lower-bandwidth use of the interconnect 54*b*. While following both forks of these tentative execution plans, the quality of service scheduler may identify that the tentative execution plan using the interconnect at a high bandwidth is capable of meeting the quality of service requirements defined by the deadline LT. However, the tentative execution plan using the interconnect at a lower bandwidth 54*b* is not capable of meeting the deadline LT.

According to an embodiment, the method further comprises obtaining 21, from the request to compute a job, a first 44 processor type associated with the first atomic computational process, and a second processor type associated with the second atomic computation process, and determining the one or more execution plans by interrogating the register of the plurality of elements of the heterogenous processing system SOC to identify at least one combination of first and second processor types capable of computing the job defined in the request, and generating the one or more execution plans of at least the first and second linked atomic computational processes based on the identified at least one combination of first C1 and second GPU processor types.

According to an embodiment, the method further comprises determining the one or more execution plans by obtaining a first delay of the first 44 atomic computational process, when executing the first atomic computational process on the first processor type, obtaining a second delay of the second 46 atomic computational process, when executing the second atomic computational process on the second processor type, and generating the one or more execution plans of at least the first 44 and second linked 46 atomic computational processes based on the identified at least first and second delays.

According to an embodiment, the method further comprises identifying, from the register of the plurality of elements, at least one intermediate element P1 of the heterogenous processing system SOC, wherein the at least one intermediate element is configured to transfer data between the first 44 atomic computational process and the second 46 atomic computational process, and determining the one or more execution plans by determining an intermediate delay associated with the at least one intermediate element P1 of the heterogenous processing system, and generating the one or more execution plans of at least the first and second linked atomic computational processes based on the identified intermediate delay.

As denoted in FIG. 3C, a practical implementation of an event chain 42, 44, 46, 48 may also consider the time delay and other parameters associated with inter-event communication. The intermediate elements P1 and P2 illustrated in FIG. 3C represent a time delay caused by, for example, a shared cache L2 access operation between, for example, a CPU C1 and a GPU. At least one of intermediate elements P1 or P2 may represent a time delay caused by a bus access, or a network adapter access. When generating the tentative execution plans, the delay caused by the intermediate elements P1 and P2 may be parameterised according to configurability options of the intermediate elements. For example, if P1 and P2 represent accessing a main memory, a tentative execution plan may be subdivided into special cases where the intermediate elements represent a range of memory access bandwidths. The QOS scheduler may determine that given tentative execution plan is viable for a subset of parameters of the intermediate elements. For example, the QOS scheduler may determine that a given tentative execution plan is viable for a subset of memory access bandwidths, or cache access bandwidths FIG. 4 schematically illustrates a further example of a system on chip architecture.

To contextualise the method, an exemplary data processing system is described. The system on chip SOC illustrated in FIG. 2 comprises a multicore processing unit comprising four processors (cores) C1-C4. The processor C1 comprises a cache L1 that may be addressed processor C1. The multicore processing unit further comprises a shared cache L2 that all processors C1-C4 of the multicore processing unit may access simultaneously. The cache L2 is, in an example, a coherent cache An operating system (or a hypervisor) hosts a plurality of mixed criticality applications A1-A4. For example, application A1 is a high-criticality image recognition algorithm as utilised in autonomous driving.

Application A2 is a low criticality infotainment program. The operating system also hosts a quality of service QoS supervisor, for example, as a daemon process (not being directly accessible to a user).

An interconnect IC communicably couples the multicore processing unit elements. In an example, the interconnect is a bus. In an example, the interconnect is a cache-coherent mesh interconnect such as Corelink™ as provided by ARM™. As illustrated, the interconnect IC connects the multicore processing unit with at least a graphics processing unit GPU, a network adapter NA (such as a CANBUS™ adapter), at least one memory MEM, and at least one special-purpose processor CA. The special-purpose processor may, for example, be a machine learning accelerator. A skilled person will appreciate that many topologies can be provided based on the application scenario of interest.

According to an embodiment, the method further comprises selecting, as an intended execution plan, an execution plan of the at least first 44 and second 46 linked atomic computational processes that is capable of meeting the quality of service requirement provided by the application A1-A4 further comprises for at least one execution plan of at least the first 44 and second 46 linked atomic computational processes determining, via a plurality of resource managers RM of a corresponding plurality of elements C, GPU, LA, IL, NA, MEM of the heterogenous processing system SOC required to perform the at least one execution plan, the availability of the corresponding plurality of elements of the heterogenous processing system to perform the intended execution plan if the corresponding plurality of elements of the heterogenous processing system are available to perform the at least one execution plan, and establishing a plurality of agreements between the corresponding resource managers of the plurality of elements of the heterogenous processing system (SOC) required to perform the at least one execution plan, and the quality of service scheduler (QOS).

Accordingly, the representation of a heterogenous processing system (SOC) in FIG. 4 illustrates that each element in the SOC, such as a processor, bus, memory, and the like in the SOC comprise a resource manager RM for monitoring the activity and/or capability of the respective element. In an example, each resource manager is configured to communicate with a register of a plurality of elements in the QOS scheduler to inform the QOS scheduler as to a current and future capability and availability of a respective element in the SOC. Such communication continuous, or on a sample basis, or on an event-triggered basis. In an embodiment, the resource manager RM may provide a likelihood that it can meet a resource requirement over a given time window. In an embodiment, the resource manager RM may provide to the register of a plurality of elements in the QOS scheduler a best-effort range of resources based on the communicated resource requirement.

A CPU resource manager RM-C is responsible for reserving CPU resources on at least one processor for different tasks in at least one application A1. The RM-C may use a table driven scheduler to reserve a specific time slots. The RM-C may use a reservation-based scheduler for allocating a predetermined number of units of processing cycles per predetermined unit of time.

An interconnect resource manager RM-IL is configured to assign interconnect resources for traffic arising from different memory masters, for example. These are different processors, and other devices such as a GPU, that share the interconnect. Modern interconnect, such as ARM™ NIC 400, provide interfaces via configuration enabling configuration (via configuration registers) of various parameters such as the average latency rate, a number of outstanding transactions in a given period, and the like.

A memory resource manager RM-MEM is configured to regulate the memory traffic that each processor can access in a predetermined time interval. The memory resource manager may monitor the memory traffic.

A cache resource manager RM-L2 may apply static, and/or dynamic cache partitioning mechanisms to allocate per-processor, and per-application level partitioning. Cache locking, cache colouring, and the like are examples of such mechanisms.

In an example, the QOS scheduler is configured to observe one or more resource managers of the heterogenous processing system SOC and perform as a resource consumption watchdog. In other words, the QOS scheduler is configured to throttle or suspend applications exceeding their resource budget.

In an example, a newly initiated application having a further quality of service requirement (other words, an application that is initiated while several other applications are already running on the heterogenous processing system SOC) is configured to identify at least one tentative execution plan, and to interrogate one or more resource managers of the heterogenous processing system QOS to negotiate a further resource agreement with one or more of the resource managers, wherein the further resource agreement is compatible with the quality of service requirements of the applications that are already running on the heterogenous processing system.

In an example, the QOS scheduler communicates resource requirements to one or more of the resource managers RM. In an example, the QOS scheduler is configured to establish an agreement (or a resource contract) with a resource manager of an element in the SOC. Upon a request to establish an agreement from the QOS scheduler, a given resource manager RM performs a capacity check against the communicated resource requirement from the QOS scheduler, and informs the register of the plurality of elements in the QOS scheduler whether or not it can meet the resource requirement.

The QOS scheduler monitors the register of the plurality of elements and assesses the responses from the plurality of resource managers RMs. If a resource manager RM agrees to an agreement, then it is bound to fulfil the agreement, or in an example, to provide a best effort to fulfil the agreement, and to make the required resources available to the QOS schedule in fulfilment of an intended execution plan.

A skilled reader will appreciate that although FIG. 4 illustrates the resource managers of each element in the SOC to reside within the elements of the SOC, another practical implementation is that the resource managers are implemented as a single software module within, for example, an operating system communicably coupled to the QOS scheduler. In this case, each element of the SOC exposes interfaces to the resource manager software module within the operating system, to enable monitoring and control of the elements in the SOC.

In an example, all resource managers associated with at least one tentative plan confirm the ability of their resources within the quality of service requirement provided by the application A1 (such as a deadline). In this case, the at least one tentative plan is designated as an intended execution plan, and the QOS scheduler proceeds to negotiate agreements with the elements referenced in the at least one tentative plan designated as an intended execution plan.

In another example, some of the resource managers RM cannot sufficiently allocate resources. In one response option, the QOS scheduler may prioritise the allocation of elements in the SOC to a specific application A1, such as an application A1 having a high priority, or safety criticality, relative to other applications.

In another example, the QOS scheduler is configured to adjust resource requirements of at least one of the atomic computational processes in an attempt to meet the quality of service requirements. For example, if enough memory resources are not available, the QOS scheduler may increase the transaction rate at the interconnect IL and the CPU C1 allocated to the application A1, to compensate for possible slowdown.

According to an embodiment, the method further comprises, during execution of the intended execution plan:
  receiving, from at least one resource manager RM of an element of comprised within the plurality of elements of the heterogenous processing system SOC, a notification that the corresponding element cannot fulfil a related agreement;
  determining, based on the register of the plurality of elements, an updated execution plan comprising at least a further element within the plurality of elements of the heterogenous processing system that is capable of fulfilling the related agreement; and
  updating the intended execution plan to incorporate at least the further element within the plurality of elements of the heterogenous processing system SOC.

Accordingly, when executing according to a "best effort" approach, at least one element in the heterogenous processing system may be unable to carry out the intended execution plan to meet the quality of service requirement provided by the application A1. In an embodiment, the quality of service scheduler references one or more of the tentative execution plans and attempts to substitute the at least one element that is not able to carry out the intended execution plan for another element referenced in another tentative execution plan. The substitution may comprise a renewed negotiation between the quality of service schedule and the updated element obtained from the tentative execution plan. Assuming agreement of the updated element to be included in the intended execution plan, the intended execution plan is then updated.

According to an embodiment, the method further comprises profiling the execution of the at least first 44 and second 46 linked atomic computational processes on a plurality of simulated configurations of the plurality of elements of the heterogenous processing system SOC, and determining the one or more execution plans based, additionally, on the results of the profiling.

For example, the QOS scheduler is configured to perform offline profiling the memory usage of at least one application A1 to arrive at a minimum bandwidth needed by the application when executing on the CPU (or the GPU). Alternatively, pre-computed profile results can be obtained by the QOS scheduler. The QOS scheduler is optionally configured to profile the cache access behaviour of the at least one application A1 to determine, for example, the working set size and the required dedicated cache space. In an example, the QOS scheduler may derive, by application profiling, latency requirements on the interconnect, and therefore computes a number of transactions per second that must be dedicated to a given application A1 within an event chain. In an example, the CPU processing budget for at least one of the executed applications A1 is profiled.

According to an embodiment, the intermediate element of the heterogenous processing system SOC is at least one of: a cache L2, at least one data interconnect bus IL, a memory MEM or a network interface NA.

According to an embodiment, the first 44 and second 46 computational processors each comprise an element of a different type selected from the following list: a central processing unit, a graphics processing unit, a microcontroller, a digital signal processor, an application specific instruction set processor, a machine learning accelerator, and/or a field programmable gate array.

According to a second aspect, there is provided a system SOC comprising:
 a heterogenous processing system SOC comprising at least a first processor C1, and a second processor of a different type GPU; and
 a scheduler QOS configured to schedule the execution of at least first and second linked atomic computational processes on the heterogenous processing system SOC, wherein the scheduler is configured to:
 receive, from an application A1-A4, a request to compute a job, wherein the job comprises at least first 44 and second 46 linked atomic computational processes, and wherein the job is associated with a quality of service requirement provided by the application;
 determine, based on a register of a plurality of elements of the heterogenous processing system SOC denoting at least the first and a second processor, one or more tentative execution plans of at least the first and second linked atomic computational processes on the plurality of elements of the heterogenous processing system;
 select, as an intended execution plan, an execution plan of the at least first and second linked atomic computational processes on at least a first and a second processor of a different type comprised in the heterogenous processing system, wherein the intended execution plan is capable of meeting the quality of service requirement provided by the application; and
 schedule the execution of the at least first and second linked atomic computational processes on the at least first and a second processors of a different type according to the intended execution plan. According to an embodiment, the heterogenous processing system SOC and the scheduler are comprised in a System on Chip.

For example, the System on Chip may comprise one, or more, of the ARM™ Cortex-A, Cortex-R, or Cortex-M CPUs, although the techniques herein are also applicable to other processor types.

According to an embodiment, there is provided an electronic control unit ECU comprising the system SOC. According to an embodiment, there is provided a vehicle comprising the electronic control unit ECU. An example, the vehicle may be a driving-assisted and/or autonomous vehicle.

According to a third aspect, there is provided a computer program element comprising machine-readable instructions which, when executed by a processor, cause the processor to perform the steps of the first aspect, or its embodiments.

According to a fourth aspect, there is provided a computer readable medium comprising the computer program element of the third aspect.

The computer readable medium is configured to store a computer program, application, logic including machine code capable of being executed by a processor. The computer readable medium includes RAM, ROM, EEPROM, and other devices that store information that may be used by the processor. In examples, the processor and the computer readable medium are integrated on the same silicon die, or in the same packaging. In examples, the computer readable medium is a hard disc drive, solid state storage device, or the like. In an example, the signal may be communicated over a data communication network such as the Internet as a download, or software update, for example.

The examples provided in the drawings and described in the foregoing written description are intended for providing an understanding of the principles of this specification. No limitation to the scope of the appended claims is intended thereby. The present specification describes alterations and modifications to the illustrated examples. Only the preferred examples have been presented, and all changes, modifications and further applications to these within the scope of the specification are desired to be protected.

What is claimed is:

1. A computer-implemented method of a quality of service scheduler for scheduling execution of at least a first linked atomic computational process and a second linked atomic computational process on a heterogenous processing system, the heterogenous processing system including at least a first processor, and a second processor of a different type, the method comprising the following steps:
 receiving, from an application, a request to compute a job, wherein the job including at least first and second linked atomic computational processes, the job being associated with a quality of service requirement provided by the application;
 determining, based on a register of a plurality of elements of the heterogenous processing system denoting at least the first processor and the second processor, one or more tentative execution plans of at least the first and second linked atomic computational processes on the plurality of elements of the heterogenous processing system;

identifying, from the register of the plurality of elements, at least one intermediate element of the heterogenous processing system, wherein the at least one intermediate element is configured to transfer data between the first atomic computational process and the second atomic computational process;

selecting, as an intended execution plan, an execution plan of the at least first and second linked atomic computational processes on the at least first and a second processor of a different type comprised in the heterogenous processing system, wherein the intended execution plan is capable of meeting the quality of service requirement provided by the application; and scheduling the execution of the at least first and second linked atomic computational processes on at least the first and the second processors of a different type according to the intended execution plan, wherein the one or more execution plans are determined by:
  determining an intermediate delay associated with the at least one intermediate element of the heterogenous processing system, and
  generating the one or more execution plans of at least the first and second linked atomic computational processes based on the determined intermediate delay.

2. The computer-implemented method according to claim 1, further comprising:
  executing the at least first and second linked atomic computational processes on at least the first and the second processor of a different type comprised in the heterogenous processing system according to the intended execution plan to compute the job; and
  returning a result of the job to the application.

3. The computer-implemented method according to claim 2, wherein the quality of service requirement provided by the application is a deadline defining when the at least first and second linked atomic processes must have returned the result of the job to the application.

4. The computer-implemented method according to claim 1, further comprising:
  obtaining, from the request to compute the job, a first processor type associated with the first atomic computational process, and a second processor type associated with the second atomic computation process; and
  determining the one or more execution plans by:
    interrogating the register of the plurality of elements of the heterogenous processing system to identify at least one combination of the first and second processor types capable of computing the job defined in the request, and
    generating the one or more execution plans of at least the first and second linked atomic computational processes based on the identified at least one combination of the first and second processor types.

5. The computer-implemented method according to claim 4, further comprising:
  determining the one or more execution plans by:
    obtaining a first delay of the first atomic computational process, when executing the first atomic computational process on the first processor type,
    obtaining a second delay of the second atomic computational process, when executing the second atomic computational process on the second processor type, and
    generating the one or more execution plans of at least the first and second linked atomic computational processes based on the identified at least first and second delays.

6. The computer-implemented method according to claim 1, wherein the selecting, as the intended execution plan, the execution plan of at least the first and second linked atomic computational processes that is capable of meeting the quality of service requirement provided by the application further comprises:
  for at least one execution plan of at least the first and second linked atomic computational processes:
    determining, via a plurality of resource managers of a corresponding plurality of elements of the heterogenous processing system required to perform the at least one execution plan, an availability of the corresponding plurality of elements of the heterogenous processing system to perform the intended execution plan;
    when the corresponding plurality of elements of the heterogenous processing system are available to perform the at least one execution plan:
      establishing a plurality of agreements between the corresponding resource managers of the plurality of elements of the heterogenous processing system required to perform the at least one execution plan, and the quality of service scheduler.

7. The computer-implemented method according to claim 6, further comprising:
  during execution of the intended execution plan:
    receiving, from at least one resource manager of an element comprised within the plurality of elements of the heterogenous processing system, a notification that the element cannot fulfil a related agreement;
    determining, based on the register of the plurality of elements, an updated execution plan including at least a further element within the plurality of elements of the heterogenous processing system that is capable of fulfilling the related agreement; and
    updating the intended execution plan to incorporate at least the further element within the plurality of elements of the heterogenous processing system.

8. The computer-implemented method according to claim 1, further comprising:
  profiling the execution of the at least first and second linked atomic computational processes on a plurality of simulated configurations of the plurality of elements of the heterogenous processing system; and
  determining the one or more execution plans based, additionally, on results of the profiling.

9. The computer-implemented method according to claim 1, wherein the intermediate element of the heterogenous processing system is at least one of: a cache, or at least one data interconnect bus, or a memory, or a network interface.

10. The computer-implemented method according to claim 1, wherein the first and second computational processors each include an element of a different type selected from the following list: a central processing unit, and/or a graphics processing unit, and/or a microcontroller, and/or a digital signal processor, and/or an application specific instruction set processor, and/or a machine learning accelerator, and/or a field programmable gate array.

11. A system, comprising:
  a heterogenous processing system including at least a first processor, and a second processor of a different type; and a scheduler configured to schedule execution of at least first and second linked atomic computational processes on the heterogenous processing system, wherein the scheduler is configured to:
  receive, from an application, a request to compute a job, wherein the job including at least first and second linked atomic computational processes, the job being associated with a quality of service requirement provided by the application;
  determine, based on a register of a plurality of elements of the heterogenous processing system denoting at least the first processor and the second processor, one or more tentative execution plans of at least the first and second linked atomic computational processes on the plurality of elements of the heterogenous processing system;
  identify, from the register of the plurality of elements, at least one intermediate element of the heterogenous processing system, wherein the at least one intermediate element is configured to transfer data between the first atomic computational process and the second atomic computational process;
  select, as an intended execution plan, an execution plan of the at least first and second linked atomic computational processes on the at least first and a second processor of a different type comprised in the heterogenous processing system, wherein the intended execution plan is capable of meeting the quality of service requirement provided by the application; and
  schedule the execution of the at least first and second linked atomic computational processes on at least the first and the second processors of a different type according to the intended execution plan,
  wherein the one or more execution plans are determined by:
    determining an intermediate delay associated with the at least one intermediate element of the heterogenous processing system, and
    generating the one or more execution plans of at least the first and second linked atomic computational processes based on the determined intermediate delay.

12. The system according to claim 11, wherein the heterogenous processing system and the scheduler are comprised in a System on Chip.

13. A non-transitory computer readable medium on which is stored a computer program for scheduling execution of at least a first linked atomic computation process and a second linked atomic computational process on a heterogenous processing system, the heterogenous processing system including at least a first processor, and a second processor of a different type, the computer program, when executed by a computer processor, causing the computer processor to perform the following steps:
  receiving, from an application, a request to compute a job, wherein the job including at least first and second linked atomic computational processes, the job being associated with a quality of service requirement provided by the application;
  determining, based on a register of a plurality of elements of the heterogenous processing system denoting at least the first processor and the second processor, one or more tentative execution plans of at least the first and second linked atomic computational processes on the plurality of elements of the heterogenous processing system;
  identifying, from the register of the plurality of elements, at least one intermediate element of the heterogenous processing system, wherein the at least one intermediate element is configured to transfer data between the first atomic computational process and the second atomic computational process;
  selecting, as an intended execution plan, an execution plan of the at least first and second linked atomic computational processes on the at least first and a second processor of a different type comprised in the heterogenous processing system, wherein the intended execution plan is capable of meeting the quality of service requirement provided by the application; and
  scheduling the execution of the at least first and second linked atomic computational processes on at least the first and the second processors of a different type according to the intended execution plan,
  wherein the one or more execution plans are determined by:
    determining an intermediate delay associated with the at least one intermediate element of the heterogenous processing system, and
    generating the one or more execution plans of at least the first and second linked atomic computational processes based on the determined intermediate delay.

* * * * *